(12) United States Patent
Youm

(10) Patent No.: US 7,113,380 B2
(45) Date of Patent: Sep. 26, 2006

(54) POWER SUPPLY DEVICE AND CONTROL METHOD THEREOF

(75) Inventor: Jang-hyoun Youm, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 382 days.

(21) Appl. No.: 10/661,573

(22) Filed: Sep. 15, 2003

(65) Prior Publication Data
US 2004/0136133 A1 Jul. 15, 2004

(30) Foreign Application Priority Data
Jan. 9, 2003 (KR) .................. 10-2003-0001365

(51) Int. Cl.
*H02H 5/04* (2006.01)
(52) U.S. Cl. ........................ 361/91.1; 361/23
(58) Field of Classification Search ............... 361/15, 361/18, 20, 23, 91.1, 111; 363/37, 49
See application file for complete search history.

(56) References Cited

U.S. PATENT DOCUMENTS

| 6,043,705 | A | * | 3/2000 | Jiang ............................ 327/589 |
| 6,069,811 | A | * | 5/2000 | Moriguchi et al. ......... 363/142 |
| 6,465,991 | B1 | * | 10/2002 | Chang ......................... 323/222 |
| 6,804,127 | B1 | * | 10/2004 | Zhou ............................ 363/37 |

FOREIGN PATENT DOCUMENTS

| EP | 1168588 A1 | 1/2002 |
| JP | 01-248971 | 10/1989 |
| JP | 5-56629 | 3/1993 |
| JP | 05-070193 | 3/1993 |
| JP | 2001-268933 | 9/2001 |
| KR | 1997-4502 | 3/1997 |
| KR | 10-231214 | 8/1999 |
| KR | 10-265668 | 6/2000 |
| KR | 10-353357 | 9/2002 |
| KR | 10-358764 | 10/2002 |

* cited by examiner

Primary Examiner—Brian Sircus
Assistant Examiner—Danny Nguyen
(74) Attorney, Agent, or Firm—Staas & Halsey LLP (57) ABSTRACT

A power supply device for inverting power to be supplied to a motor and a method of controlling the power supply device. The power supply device includes an inrush protection (IP) circuit, a power factor correction (PFC) circuit and an overvoltage protection (OP) circuit. A controller and a pair of relays selectively connect predetermined components so that at least one component is selectively changed from operation in one of the IP, PFC and OP circuits to operation in another of the IP, PFC and OP circuits in response to a detected value of an inverter input voltage. The inrush protection circuit operates in a start up mode; the PFC circuit operates while normally driving the motor; and the overvoltage protection circuit operates where the inverter input voltage increases due to regeneration by the motor.

20 Claims, 7 Drawing Sheets

Relay 8 On

FIG. 7C

Hysterisis ($V_{PN}$)

POWER SUPPLY DEVICE AND CONTROL METHOD THEREOF

CROSS-REFERENCE TO RELATED APPLICATIONS

This application claims the benefit of Korean Patent Application No. 2003-1365, filed Jan. 9, 2003, in the Korean Intellectual Property Office, the disclosure of which is incorporated herein by reference.

BACKGROUND OF THE INVENTION

1. Field of the Invention

The present invention relates to a power supply device and a method of controlling the power supply device, and more particularly, to a power supply device having an inrush current protection circuit, a power factor correction (PFC) circuit and an overvoltage protection circuit and a method of controlling the inrush current protection circuit, the PFC circuit and the overvoltage protection circuit.

2. Description of the Related Art

Figure 1:
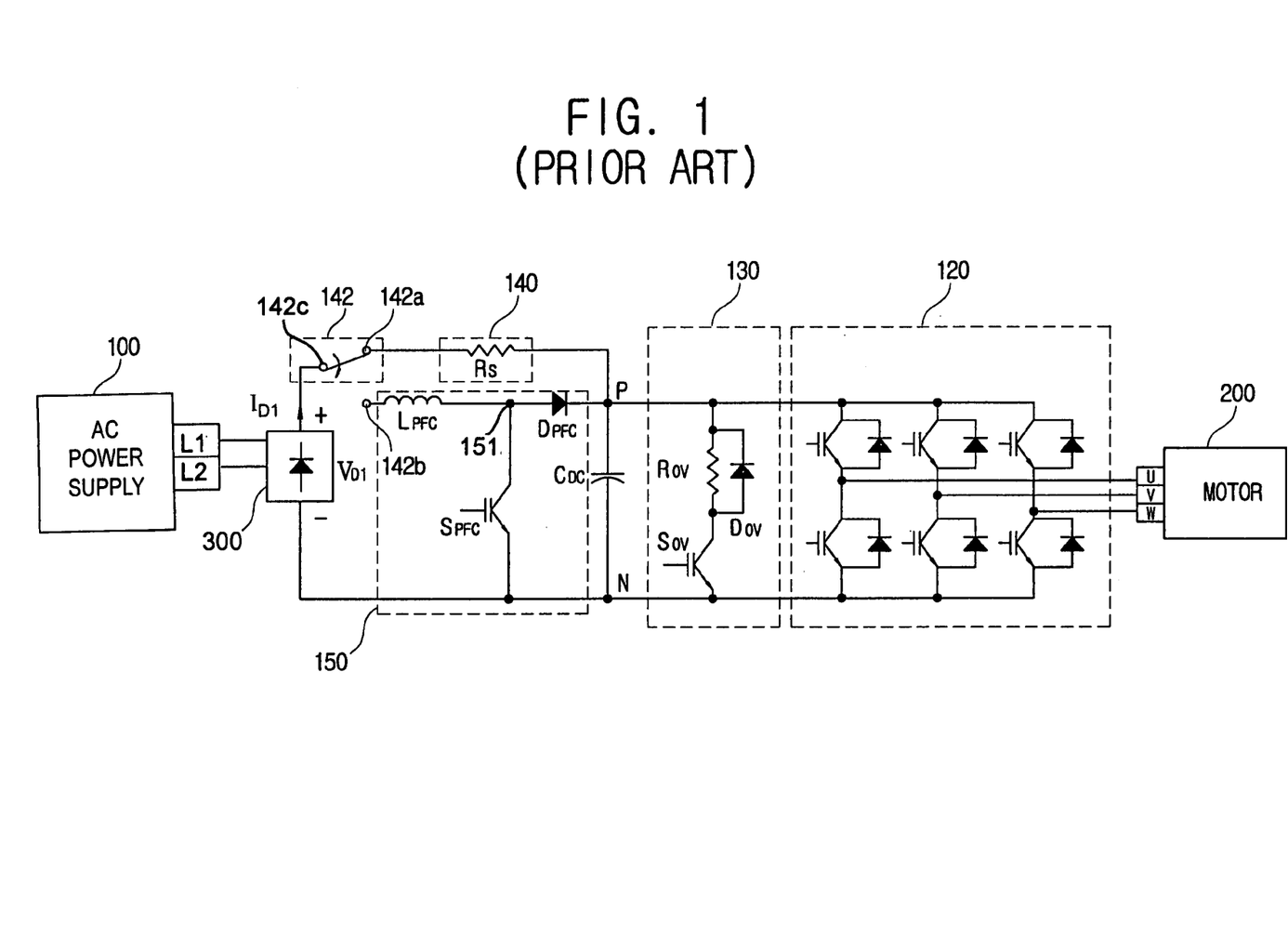
FIG. 1 is a view illustrating a circuit of a conventional power supply device.

A three-phase motor is a motor having a plurality of windings which are arranged around a rotor and which receive energy from a three phase voltage to rotate the motor. As shown in FIG. 1, a power supply device which obtains a three-phase voltage necessary for driving a motor 200 via input terminals U, V and W of the motor 200, comprises an AC power supply 100 which supplies a commercial AC power, such as for example, (AC 110/220V), a rectifier 300 which rectifies the AC power output from the AC power supply 100, a capacitor $C_{DC}$ which smoothes a voltage rectified by the rectifier 300, an inverter 120 which inverts a DC power output from the capacitor $C_{DC}$ to an AC power having various frequencies and outputs a three-phase voltage. The power supply device may further comprise an inrush current protection circuit 140 which prevents an inrush current into the capacitor $C_{DC}$ during an initial supply of power, a power factor correction (PFC) circuit 150 which maintains an output voltage from the capacitor $C_{DC}$ at a constant value, and an overvoltage protection circuit 130 which protects the capacitor $C_{DC}$ from an overvoltage.

In the inverter 120, a pulse width modulation (PWM) part (not shown) generates a PWM control signal and a plurality of transistors are turned on/off according to a square wave signal of the PWM part. The power supply device comprises a controller (not shown) which controls the output frequency thereof so as to control a rotation speed of the motor 200 and turns on/off an output of the inverter 120 by turning on/off the transistors according to the PWM control signal.

The inrush current protection circuit 140 comprises an inrush current protection resistor Rs provided between the rectifier 300 and the capacitor $C_{DC}$ and connected to the capacitor $C_{DC}$. A relay part 142 comprises first, second and third contacting points 142a, 142b and 142c. When the relay part 142 connects the first contacting point 142a with the third contacting point 142b, the inrush current protection resistor Rs connects the capacitor $C_{DC}$ with the rectifier 300, which allows power rectified by the rectifier 300 and charged to the capacitor $C_{DC}$ to be limited by the resistor Rs, to prevent the capacitor $C_{DC}$ from being broken down by excessive inrush current in an initial supply of power.

The PFC circuit 150 comprises a PFC switching unit $S_{PFC}$ such as a field effect transistor, a PFC diode $D_{PFC}$ provided with a cathode connected to the capacitor $C_{DC}$ and an anode connected to a node 151 of the PFC switching unit $S_{PFC}$, and a PFC inductor $L_{PFC}$ provided between the node 151 and the rectifier 300. Herein, the PFC inductor $L_{PFC}$ is disconnected from the rectifier 300 when the relay part 142 connects the first contacting point 142a with the third contacting point 142c, and connected to the rectifier 300 when the relay part 142 connects the second contacting point 142b with the third contacting point 142c. The PFC circuit 150 maintains a voltage applied across the capacitor $C_{DC}$ at a constant value by turning on/off the PFC switching unit $S_{PFC}$ in driving the motor 200, and improves a power factor by making an input current input to the PFC circuit 150 have a same phase as a phase of an input voltage.

The overvoltage protection circuit 130 is connected in parallel with the capacitor $C_{DC}$, and provided with an overvoltage protection switching unit $S_{OV}$ connected in series with a parallel combination of an overvoltage protection diode $D_{OV}$ and an overvoltage protection resistor $R_{OV}$. As to the overvoltage protection circuit 130, if the voltage applied across the capacitor $C_{DC}$ is increased and reaches a predetermined overvoltage region due to a voltage regenerated through the inverter 120 from the motor 200 in driving the motor 200, the overvoltage protection switching unit Sov is turned On, to thereby prevent the capacitor $C_{DC}$ from being broken down by an overvoltage.

In the conventional power supply device shown in FIG. 1, the inrush current protection circuit 140 functions until a voltage charged in the capacitor $C_{DC}$ reaches a reference charging voltage after power is initially applied from the AC power supply 100. The inrush current protection circuit 140 becomes unnecessary after a voltage charged in the capacitor $C_{DC}$ reaches the reference charging voltage.

Since the PFC circuit 150 operates after the voltage applied across the capacitor $C_{DC}$ is stabilized (i.e. sufficiently charged), operation of the PFC circuit 150 is not necessary while the inrush current protection circuit 140 operates.

Since the overvoltage protection circuit 130 operates only while the voltage applied across the capacitor $C_{DC}$ is increased by the voltage regenerated from the motor 200, operation of the overvoltage protection circuit 130 is not necessary while the inrush current protection circuit 140 operates (i.e., in an initial charging period), or while the PFC circuit 150 operates after the voltage applied across the capacitor $C_{DC}$ is stabilized.

Since large capacity components are used in the inrush current protection circuit 140, the overvoltage protection circuit 120 and the PFC circuit 150, a size of a product including the conventional power supply device shown in FIG. 1 is increased. Eliminating one or more of the large capacity components would result in a reduction in the product size and a decrease in manufacturing cost.

SUMMARY OF THE INVENTION

Accordingly, it is an aspect of the present invention to provide a power supply device and a control method thereof which allows a number of parts of the power supply device to be reduced, a size of the power to be reduced, a size of a product incorporating the power supply to be reduced, and manufacturing costs of the power supply device and the product to be reduced.

Additional and/or other aspects and advantages of the invention will be set forth in part in the description which follows and, in part, will be obvious form the description, or may be learned by practice of the invention.

The above and/or other aspects of the present invention are achieved by providing a power supply device having an AC power supply, a rectifier which rectifies power supplied from the AC power supply, and a capacitor which smoothes power rectified by the rectifier, comprising: a switching unit; a diode having a cathode connected to the capacitor and an anode connected to the switching unit; an inductor having a first end connectable to the rectifier and a second end connectable to a node between the switching unit and the anode of the diode; a resistor having a first end connected to the capacitor and a second end; a relay operable in a first position to connect the node between the switching unit and the anode of the diode to the inductor, and operable in a second position to connect the node between the switching unit and the diode to the second end of the resistor; and a controller which controls the relay to be in the second position if a voltage applied across the capacitor exceeds a predetermined PFC voltage limit.

In an aspect of the present invention, the power supply device further comprises a capacitor voltage detector which detects the voltage applied across the capacitor, wherein the controller controls the relay to be in the second position if the voltage applied across the capacitor and detected by the capacitor voltage detector exceeds the predetermined PFC voltage limit.

In an aspect of the present invention, the controller turns on/off the switching unit if the voltage applied across the capacitor and detected by the capacitor voltage detector reaches a predetermined overvoltage region and the relay is in the second position.

In an aspect of the present invention, the controller controls the relay to be in the first position if the voltage applied across the capacitor and detected by the capacitor voltage detector becomes lower than the predetermined PFC voltage limit.

In an aspect of the present invention, the power supply device further comprises a second relay operable in a first position to connect the rectifier and the second end of the resistor, and operable in a second position to connect the rectifier and the first end of the inductor.

In an aspect of the invention, the controller controls the second relay to be in the first position so that power rectified by the rectifier is supplied to the capacitor through the resistor when power is initially supplied.

In an aspect of the invention, the controller controls the second relay to transfer to the second position if the voltage applied across the capacitor exceeds a predetermined reference charging voltage in a state that the second relay is in the first position.

The foregoing and/or other aspects of the present invention are also achieved by providing a method of controlling a power supply device having an AC power supply, a rectifier which rectifies power supplied from the AC power supply, a capacitor which smoothes power rectified by the rectifier, a switching unit, a diode having a cathode connected to the capacitor and an anode connected to the switching unit, and an inductor provided between the rectifier and a node between the switching device and the diode, the method comprising: providing a resistor connectable in parallel with the diode; detecting a voltage applied across the capacitor; and disconnecting the inductor and the node between the switching unit and the diode and connecting the resistor and the node between the switching unit and the diode, if a detected voltage applied across the capacitor exceeds a predetermined PFC voltage limit.

In an aspect of the invention, the method of controlling the power supply device further comprises turning on/off the switching unit if the detected voltage applied across the capacitor reaches a predetermined overvoltage region in a state that the resistor and the node between the switching unit and the diode are connected.

In an aspect of the invention, the method of controlling the power supply device further comprises disconnecting the resistor and the node between the switching unit and the diode and connecting the inductor and the node between the switching unit and the diode, if the detected voltage applied across the capacitor becomes lower than the predetermined PFC voltage limit.

In an aspect of the invention, the method of controlling the power supply device further comprises connecting the rectifier and the resistor and disconnecting the rectifier and the inductor so that power rectified by the rectifier is supplied to the capacitor through the resistor, when power is initially supplied.

BRIEF DESCRIPTION OF THE DRAWINGS

The above and/or other aspects and advantages of the present invention will become apparent and more readily appreciated from the following description of the embodiments, taken in conjunction with the accompany drawings of which.

DESCRIPTION OF THE PREFERRED EMBODIMENT

Reference will now be made in detail to the embodiments of the present invention, examples of which are illustrated in the accompanying drawings, wherein like reference numerals refer to like elements throughout.

Figure 2:
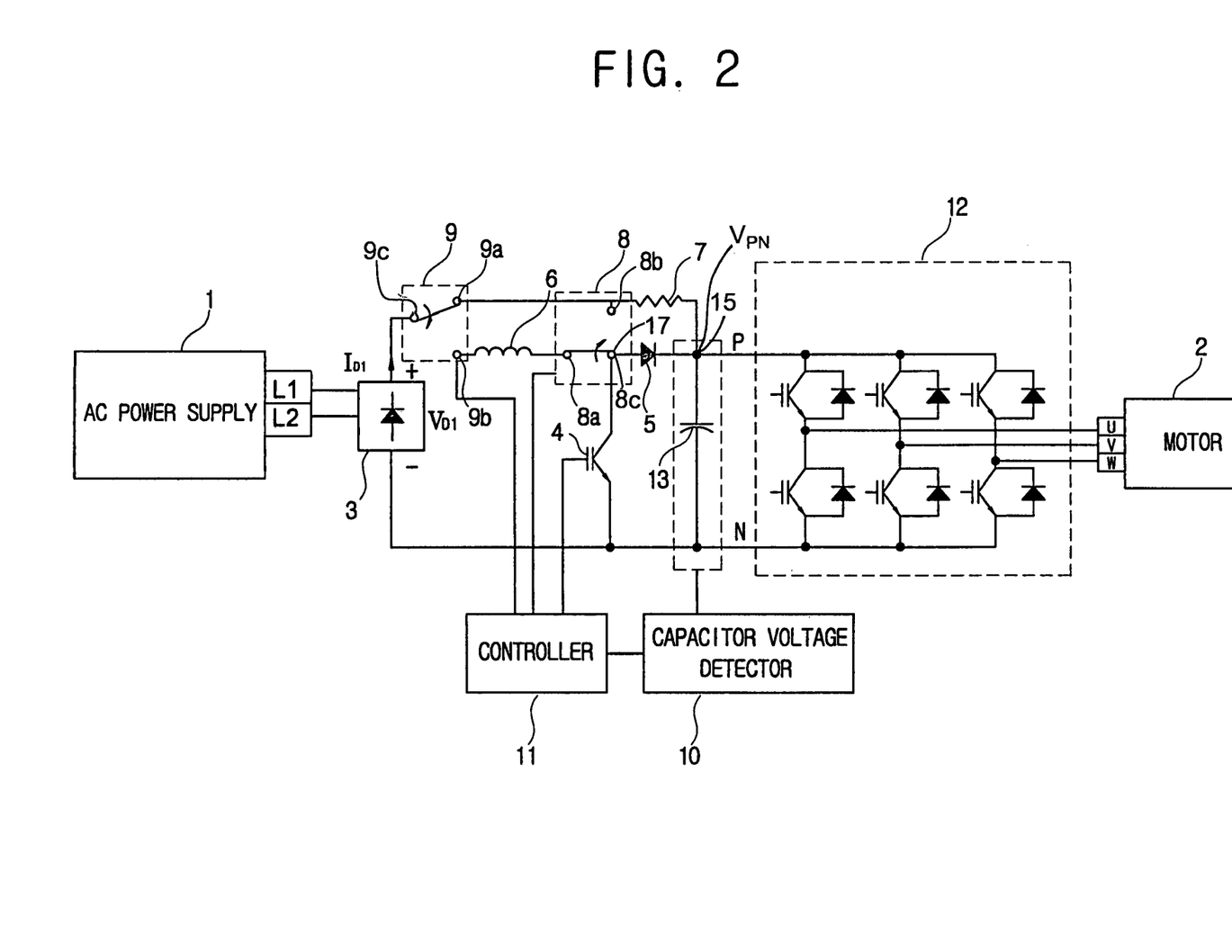
FIG. 2 is a view illustrating a state for performing an inrush current protection function in a power supply device circuit according to the present invention.

FIG. 2 illustrates a circuit of a power supply device circuit for a three-phase motor, according to an embodiment of the present invention. The power supply device shown in FIG. 2, comprises an AC power supply 1 which supplies a commercial AC power, such as for example, AC 110/220V; a rectifier 3 which rectifies the AC power; a capacitor 13 which smoothes power rectified by the rectifier 3; and a inverter 12 which inverts DC power outputted from the capacitor 13 to an AC power having a variable frequency and outputs the AC power as a three-phase voltage to terminals U, V and W of the motor 2.

The power supply device shown in FIG. 2 further comprises a switching unit 4; a diode 5 having a cathode connected to an end 15 of the capacitor 13 and an anode connected to the switching unit 4; an inductor 6 selectively connectable between the rectifier 3 and a node 17 between the switching unit 4 and the diode 5; a resistor 7 selectively connectable to the diode 5 in parallel; a first relay 8 having first second and third contacting points 8a, 8b and 8c, respectively, the relay 8 selectively connecting the node 17 and the inductor 6 via the first contacting point 8a and the third contacting point 8c and selectively connecting the node 17 and the resistor 7 via the second contacting point 8b and the third contacting point 8c; and a controller 11 which controls the first relay 8 to connect the second contacting point 8b and the third contacting point 8c if a voltage applied across the capacitor 13 exceeds a predetermined PFC voltage limit.

The power supply device according to the present invention may further comprise a capacitor voltage detector 10 which detects the voltage applied across the capacitor 13. The controller 11 may control the first relay 8 to connect the second contacting point 8b and the third contacting point 8c if the voltage applied across the capacitor 13 detected by the capacitor voltage detector 10 exceeds the predetermined PFC voltage limit.

The switching unit 4, the diode 5, and the inductor 6 according to the present invention, function as a PFC circuit. That is, in a state that the first relay 8 connects the first contacting point 8a and the third contacting point 8c, the switching unit 4, the diode 5, and the inductor 6 maintain the voltage applied across the capacitor 13 at a constant value by being connected to the rectifier 3 and the capacitor 13, and function as the PFC circuit to improve a power factor by controlling an input current input from the rectifier 3 to have a same phase as of an input voltage input from the rectifier 3.

The switching unit 4, such as a MOS transistor, or a Field effect transistor, is switched according to a signal input to a gate of the transistor. The controller 11 turns on/off the switching unit 4 by controlling the signal input to the gate of the switching unit 4.

The switching unit 4, the diode 5, and the resistor 7 function an overvoltage circuit. That is, while a function of the PFC circuit is performed with the first relay 8 connecting the first contacting point 8a and the third contacting point 8c, the voltage applied across the capacitor 13 may be increased by a voltage regenerated through the inverter 12 from a motor 2. If the voltage across the capacitor 13 continues to increase and exceeds the predetermined PFC voltage limit, the node 17 between the switching unit 4 and the diode 5 is cut off from the inductor 6 and the resistor 7 and the diode 5 are connected in parallel by the relay 8 connecting the second contacting point 8b and the third contacting point 8c. Herein, the controller 11 prevents the voltage across the capacitor 13 from being increased into an overvoltage region by turning on/off the switching unit 4 to reduce the voltage across the capacitor 13.

If the voltage across the capacitor 13 is decreased to the predetermined PFC voltage limit or lower, due to reduction of the voltage regenerated from the motor 2 by the overvoltage protection circuit, the controller 11 makes the first relay 8 to connect the first contacting point 8a and the third contacting point 8c. Thus, the switching unit 4, the diode 5, and the inductor 6 again function as the PFC circuit.

The power supply according to the present invention may further comprise a second relay 9 having a first contacting point 9a, a second contacting point 9b and a third contacting point 9c. The second relay 9 selectively connects the rectifier 3 and the resistor 7 via the first contacting point 9a and the third contacting point 9c, and selectively connects the rectifier 3 and the inductor 6 via the second contacting point 9b and the third contacting point 9c. The controller 11 makes the second relay 9 connect the contacting point 9a and the contacting point 9c so that power rectified from the rectifier 3 is supplied to the capacitor 13 through the resistor 7 when power is initially supplied from the AC power supply 1. Thus, the capacitor 13 is prevented from being broken down by an excessive inrush current by limiting current supplied to the capacitor 13 with the resistor 7.

The controller 11 makes the second relay 9 connect the second contacting point 9b and the third contacting point 9c if the voltage across the capacitor 13 exceeds a predetermined reference charging voltage. Thus, the rectifier 3 is connected to the capacitor 13 through the inductor 6, and the switching unit 4, the inductor 6 and the diode 5 perform the PFC function.

A process that performs functions of an inrush current protection, phase factor correction and overvoltage protection using the apparatus shown in FIG. 2 will be described will be described with reference to FIGS. 3A–3D.

Figure 3A:
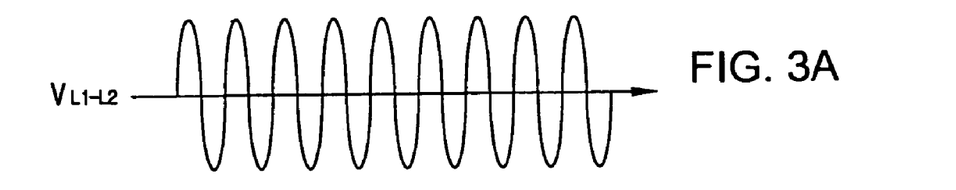
FIGS. 3A–3D are views illustrating waveforms of the power supply device circuit of the present invention in the state shown in FIG. 2.
Figure 3B:
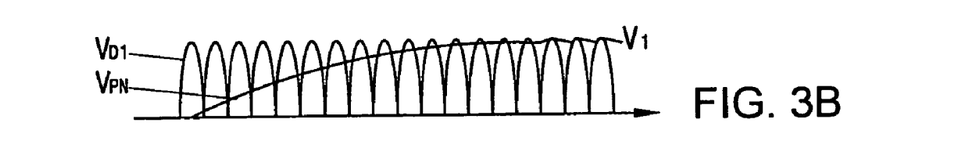
Figure 3C:
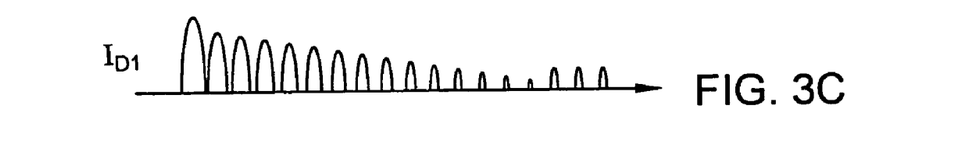
Figure 3D:
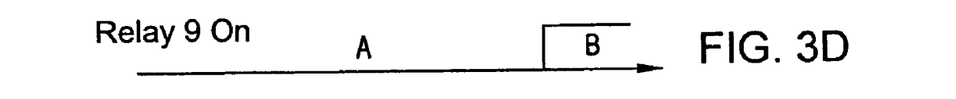
Figure 4:
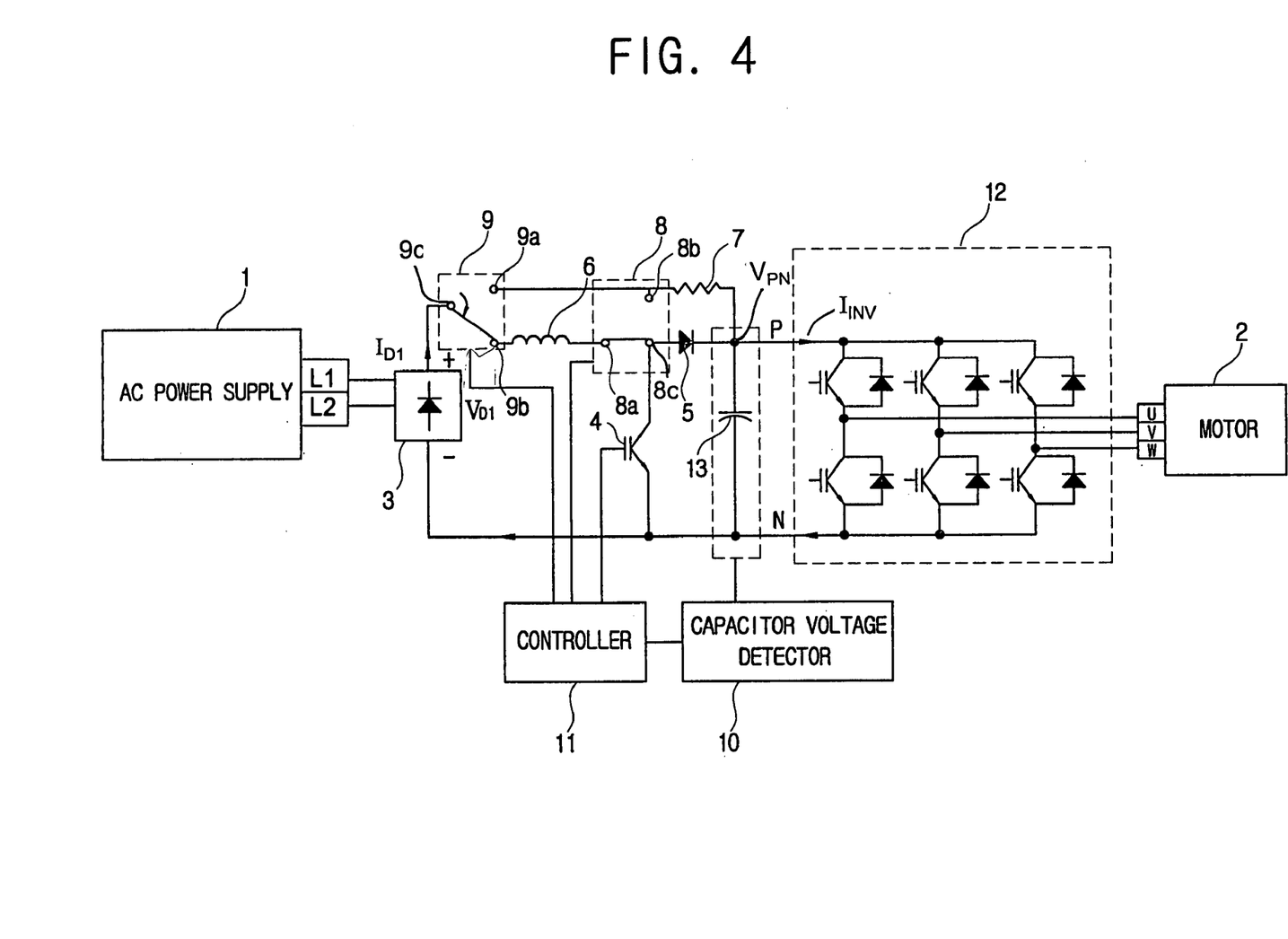
FIG. 4 is a view illustrating a state for performing a PFC function in the power supply device circuit according to the present invention.

When power is initially supplied from the AC power supply 1, the controller 11 makes the first relay 8 connect the first contacting point 8a and the third connecting point 8c, and makes the second relay 9 connect the first contacting point 9a and the third contacting point 9c. Referring now to FIG. 3B, an AC voltage V(L1–L2) supplied from the AC power supply 1 is rectified by the rectifier 3 to obtain a voltage VD1. The voltage VD1 is charged to the capacitor 13 through the resistor 7. That is, in a state that the first relay 8 connects the first contacting point 8a and the third contacting point 8c and the second relay 9 connects the first contacting point 9a and the third contacting point 9c, the resistor 7 performs an inrush current protection function. While performing the inrush current protection function, the voltage $V_{PN}$ applied across the capacitor 13 is gradually increased as the capacitor 13 is charged as shown in FIG. 3B. If the voltage $V_{PN}$ applied across the capacitor 13 exceeds a reference charging voltage V1, the controller 11 controls the second relay 9 to connect the second contacting point 9b and the third contacting point 9c. FIG. 3C illustrates a waveform of a current flowing from the rectifier 3 to the resistor 7, and FIG. 3D illustrates a point of time in which the second relay 9 operates to connect the second contacting point 9b and the third contacting point 9c.

In a state that the second relay 9 connects the second contacting point 9b and the third contacting point 9c and the first relay 8 connects the first contacting point 8a and the third contacting point 8c, the PFC function performed by the switching unit 4, the inductor 6, and the diode 5 will be described as follows, with reference to FIGS. 4 and 5A–5F.

Figure 5A:
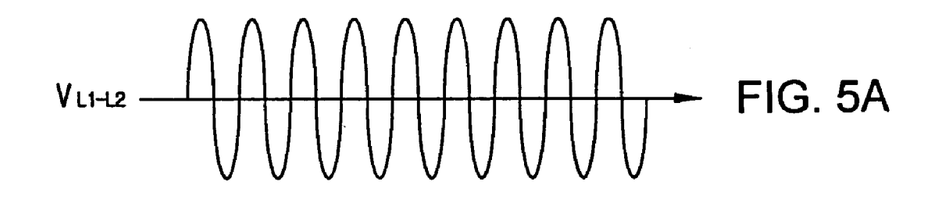
FIGS. 5A–5F are views illustrating waveforms of the power supply device circuit of the present invention in the state shown in FIG. 4.
Figure 5B:
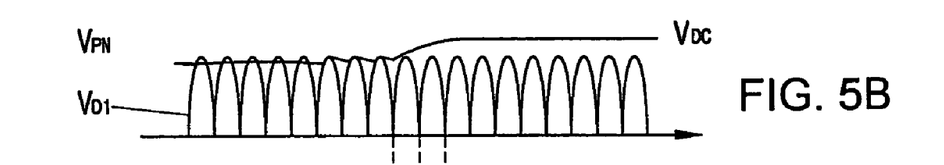
Figure 5C:
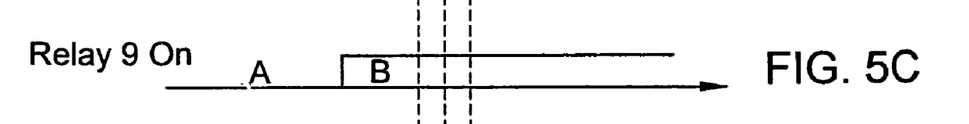
Figure 5D:
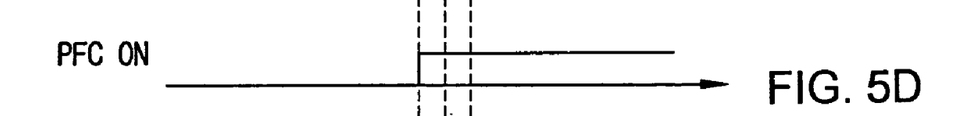
Figure 5E:
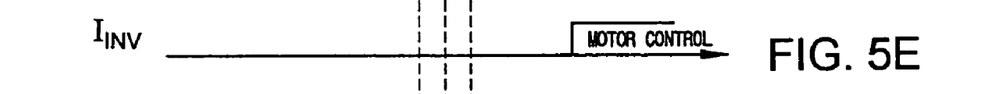
Figure 5F:
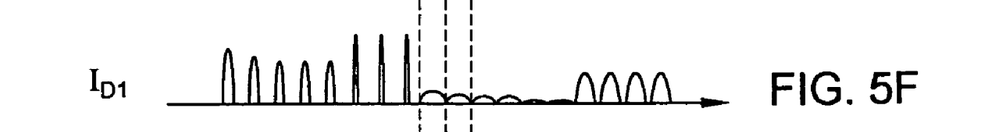
Figure 6:
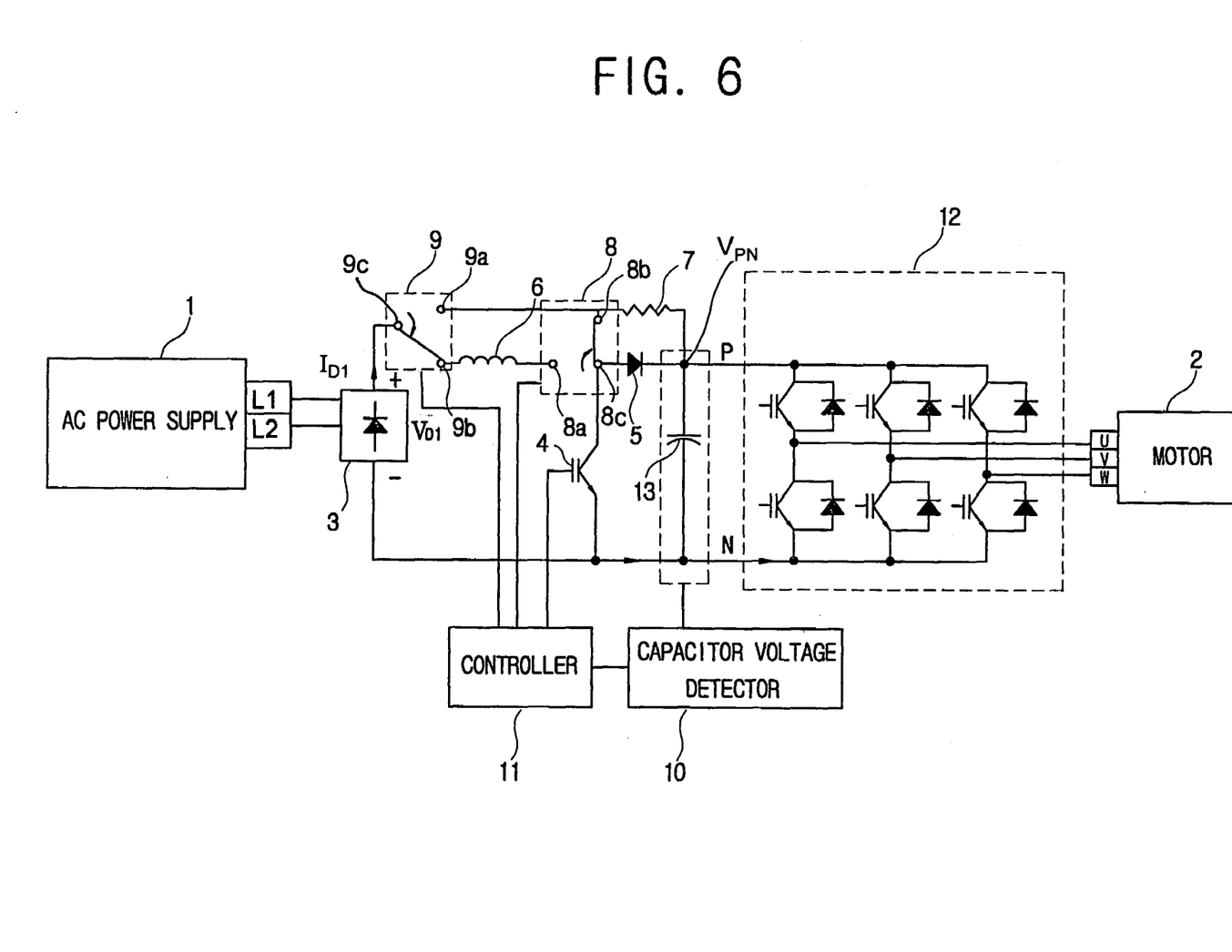
FIG. 6 is a view illustrating a state for performing an overvoltage protection function in the power supply device circuit according to the present invention.

In a state that the second relay 9 connects the contacting point 9b and the contacting point 9c, the controller 11 turns on/off the switching unit 4 so that the voltage applied $V_{PN}$ across the capacitor 13 may be maintained constant at a value $V_{DC}$. That is, the controller 11 stores energy in the inductor 6 by turning on the switching unit 4, and transmits the energy stored in the inductor 6 to the capacitor 13 through the diode 5 by turning off the switching unit 4. Thus, the voltage $V_{PN}$ applied across the capacitor 13 is maintained constant at a value $V_{DC}$, and an input current $I_{D1}$ as shown in FIG. 5F input from the rectifier 3 has a same phase as a phase of an input voltage $V_{D1}$ as shown in FIG. 5B, to thereby increase the power factor. In a state that the voltage $V_{PN}$ applied across the capacitor 13 is maintained constant at $V_{DC}$ by the PFC circuit, the motor 2 is driven according to a current $I_{INV}$ as shown in FIG. 5E. FIG. 5A is a view illustrating a waveform of an AC voltage supplied to the rectifier 3 from the AC power supply 1. FIG. 5C is a view illustrating a time when contact of the second relay 9 is switched from connecting the contacting point 9a and the contacting point 9c (A) to connecting the contacting point 9b and the contacting point 9c (B). FIG. 5D is a view illustrating a time when the PFC circuit starts to perform the power factor correction function.

While the motor 2 is driving, energy stored in the motor 2 by rotation of the motor 2 may be regenerated to the capacitor 13 through the inverter 12 under certain conditions. For example, energy stored while the motor 2 rotates regularly, is regenerated to the capacitor 13 through the inverter 12 when the motor 2 reverses a direction of rotation. Herein, energy regenerated through the inverter 12, that is, a regenerated voltage increases the voltage $V_{PN}$ applied across the capacitor 13 above the value $V_{DC}$.

When the voltage applied across the capacitor 13 is increased by the regenerated voltage regenerated through the inverter 12 from the motor 2, the overvoltage protection function of the power supply device according to the present invention will be described with reference to FIGS. 6 and 7A–7E.

Figure 7A:
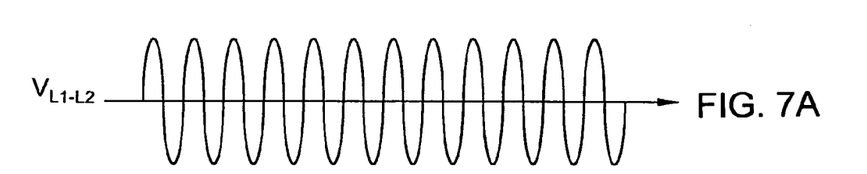
FIGS. 7A–7E are views illustrating waveforms of the power supply device circuit of the present invention in the state shown in FIG. 6.
Figure 7B:
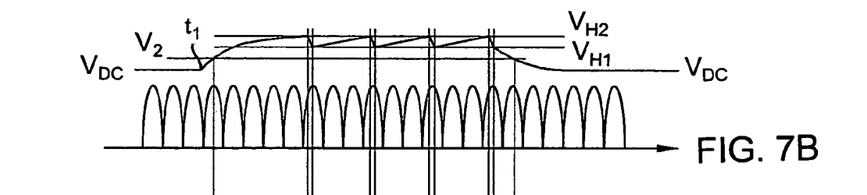
Figure 7C:
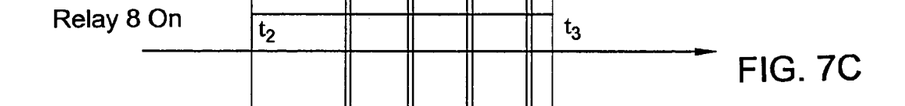

At first, if the voltage $V_{PN}$ across the capacitor 13 is increased by the regenerated voltage of the motor 2 at a time t1 shown in FIG. 7B and accordingly exceeds a PFC voltage limit ($V_2$), the controller 11 controls the first relay 8 to connect the second contacting point 8b and the third contacting point 8c at a time t2 shown in FIG. 7C (refer to (C) of FIG. 7). The PFC voltage limit $V_2$ means the voltage applied across the capacitor 13 at a moment when current does not flow from the rectifier 3 to the capacitor 13 as the voltage $V_{PN}$ is increased by the regenerated voltage.

Even when the first relay 8 is connecting the second contacting point 8b and the third contacting point 8c, the regenerated voltage from the motor 2 increases the voltage $V_{PN}$ applied across the capacitor 13. The controller 11 turns on/off the switching unit 4 when the voltage $V_{PN}$ applied across the capacitor 13 reaches an overvoltage region (hysteresis region, $V_{H1}$–$V_{H2}$).

Figure 7D:
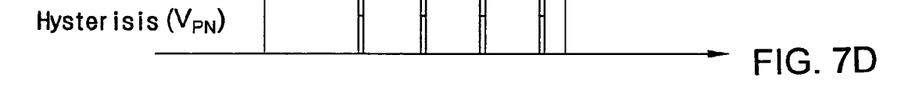
Figure 7E:
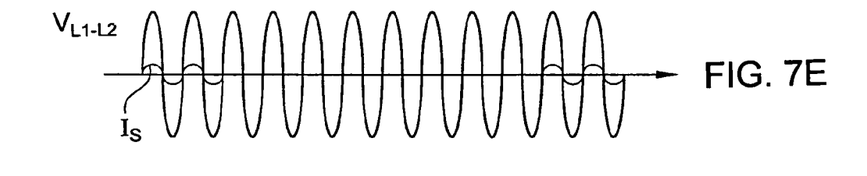

That is, if the voltage $V_{PN}$ applied across the capacitor 13 is increased and reaches an overvoltage upper limit $V_{H2}$, the controller 11 allows the regenerated voltage from the motor 2 through the resistor 7 to be consumed by turning on the switching unit 4 as shown in FIG. 7D. Thus, the voltage $V_{PN}$ applied across the capacitor 13 is decreased. If the regenerated voltage from the motor 2 is consumed through the resistor 7, so that the voltage $V_{PN}$ applied across the capacitor 13 reaches an overvoltage lower limit $V_{H1}$, the controller 11 prevents the voltage $V_{PN}$ from becoming lower than the overvoltage region ($V_{H1}$–$V_{H2}$) by turning off the switching unit 4, to maintain the voltage $V_{PN}$ within the overvoltage region ($V_{H1}$–$V_{H2}$). Thus, the controller 11 controls consumption of the regenerated voltage from the motor 2 by turning on/off the switching unit 4.

Subsequently, if the regenerated voltage of the motor 2 is all consumed, the voltage $V_{PN}$ applied across the capacitor 13 is not increased even though the switching unit 4 is off. Also, because the capacitor 13 is cut off from the AC power supply 1, the voltage $V_{PN}$ applied across the capacitor 13 is decreased by power consumed to drive the motor 2. If the voltage $V_{PN}$ applied across the capacitor 13 is decreased and becomes lower than the PFC voltage limit $V_2$, the controller 11 connects the capacitor 13 and the AC power supply 1 by operating the first relay 8 to connect the first contacting point 8a and the third contacting point 8c at a time t3 as shown in FIG. 7C. Herein, the capacitor 13 and the rectifier 3 are connected in the PFC circuit, and the voltage $V_{PN}$ applied across the capacitor 13 is maintained constant by the PFC circuit.

FIG. 7A is a waveform of the input voltage ($V_{L1-L2}$) input from the AC power supply 1 to the rectifier 3. FIG. 7C is a view illustrating a time when the first relay 8 connects the first contacting point 8a and the third contacting point 8c (time before t2), the time t2 when the first relay 8 connects the second contacting point 8b and the third contacting point 8c and the time t3 when the first relay 8 again connects the first contacting point 8a and the third contacting point 8c during operation of the overvoltage protection circuit. FIG. 7D is a view illustrating times when the switching unit 4 is turned on/off to perform the overvoltage protection function.

In the above embodiment, the power supply device according to the present invention is illustrated by reference to a three-phase motor. However, a configuration of the inverter 12 may be changed in order to supply power to a single-phase motor or other poly-phase motors, and the power supply device according to the present invention may be applied to other devices as well as a motor.

Also, in the above embodiment, the resistor is used in common in the overvoltage protection circuit and the inrush current protection circuit. However, a separate inrush current protection resistor can be provided.

With the above configuration, in the power supply device, a number of parts may be reduced and a size and a manufacturing cost of a product may be decreased by using the resistor 7, the switching unit 4, and the diode 5 necessary for implementing functions of the inrush current protection circuit, the PFC circuit, and the overvoltage protection circuit in common.

As described above, according to the present invention, a power supply device and a control method thereof the number of parts thereof to be reduced, and also the size of a product and manufacturing cost to be decreased.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A power supply device having an AC power supply, a rectifier which rectifies power supplied from the AC power supply, and a capacitor which smoothes power rectified by the rectifier, the power supply device comprising:
   a switching unit;
   a diode having a cathode connected to the capacitor and an anode connected to the switching unit;
   an inductor having a first end connected to the rectifier and a second end;
   a resistor having a first end connected to the capacitor and a second end;
   a first relay which selectively connects a node between the switching unit and the diode to one of the second end of the inductor and the second end of the resistor;
   a controller which controls the first relay to connect the node and the second end of the resistor if a voltage applied across the capacitor exceeds a predetermined PFC voltage limit; and
   a capacitor voltage detector which detects the voltage applied across the capacitor,
   wherein the controller turns on/off the switching unit if the detected voltage across the capacitor exceeds a predetermined overvoltage region in a state that the first relay connects the node and the second end of the resistor, and
   wherein the controller controls the first relay to connect the node between the diode and the switching unit and the second end of the inductor if the voltage applied across the capacitor and detected by the capacitor voltage detector becomes lower than the predetermined PFC voltage limit.

2. The power supply device according to claim 1, further comprising a second relay which selectively connects the rectifier with one of the first end of the inductor and the second end of the resistor.

3. The power supply device according to claim 2, wherein the controller controls the second relay to connect the rectifier to the second end of the resistor so that power rectified by the rectifier is supplied to the capacitor through the resistor when power is initially supplied.

4. The power supply device according to claim 3, wherein the controller controls the second relay to connect the rectifier to the first end of the inductor if the voltage applied across the capacitor exceeds a predetermined reference charging voltage in a state that the second relay is connecting the node between the diode and the switching unit and the second end of the inductor.

5. A power supply device having an AC power supply, a rectifier which rectifies power supplied from the AC power supply, and a capacitor which smoothes power rectified by the rectifier, the power supply device comprising:
    a switching unit;
    a diode having a cathode connected to the capacitor and an anode connected to the switching unit;
    an inductor having a first end connected to the rectifier and a second end;
    a resistor having a first end connected to the capacitor and a second end;
    a first relay which selectively connects a node between the switching unit and the diode to one of the second end of the inductor and the second end of the resistor; and
    a controller which controls the first relay to connect the node and the second end of the resistor if a voltage applied across the capacitor exceeds a predetermined PFC voltage limit; and
    a second relay which selectively connects the rectifier with one of the first end of the inductor and the second end of the resistor,
    wherein the controller controls the second relay to connect the rectifier to the second end of the resistor so that power rectified by the rectifier is supplied to the capacitor through the resistor when power is initially supplied, and
    wherein the controller controls the second relay to connect the rectifier to the first end of the inductor if the voltage applied across the capacitor exceeds a predetermined reference charging voltage in a state that the second relay is connecting the node between the diode and the switching unit and the second end of the inductor.

6. A method of controlling a power supply device having an AC power supply, a rectifier which rectifies power supplied from the AC power supply, a capacitor which smoothes power rectified by the rectifier, a switching unit, a diode having a cathode connected to the capacitor and an anode connected to the switching unit, and an inductor connected between the rectifier and a node between the switching device and the diode, comprising:
    providing a resistor connectable in parallel with the diode;
    detecting a voltage applied across the capacitor;
    disconnecting the inductor and the node between the switching unit and the diode, and connecting the resistor and the node between the switching unit and the diode, if a detected voltage applied across the capacitor exceeds a predetermined PFC voltage limit;
    turning on/off the switching unit if the detected voltage applied across the capacitor reaches a predetermined overvoltage region in a state that the resistor and the node between the switching unit and the diode are connected; and
    disconnecting the resistor and the node between the switching unit and the diode, and connecting the inductor and the node between the switching unit and the diode, if the detected voltage applied across the capacitor becomes lower than the predetermined PFC voltage limit.

7. The method to claim 6, further comprising:
    connecting the rectifier and the resistor and disconnecting the rectifier and the inductor so that power rectified by the rectifier is supplied to the capacitor through the resistor, when power is initially supplied.

8. A power supply device for supplying an AC motor from a source of DC power, the power supply device comprising:
    an inverter having first and second inputs and which inverts a DC drive voltage to drive the motor;
    a circuit selectively operable in an inrush current protection mode, a power factor correction mode and an overvoltage protection mode to control the DC drive voltage, the circuit comprising:
        a capacitor having first and second ends and connected with the first and second inputs, respectively, of the inverter,
        a resistor having a first end connected to the first end of the capacitor and a second end,
        a diode having a first end connected to the first end of the capacitor and a second end,
        a switching unit having a first terminal connected at a node with the second end of the diode, a second terminal connected with the second end of the capacitor and a control terminal,
        an inductor having first and second ends;
        a first relay which selectively connects the node to one of the second end of the resistor and the second end of the inductor, and
        a second relay which selectively connects the source of the DC power to one of the second end of the resistor and the first end of the inductor;
    a voltage detector which detects a value of the DC drive voltage;
    a controller which drives the control terminal and the relays to cause the circuit to selectively perform the inrush current protection mode, the power factor correction mode or the overvoltage protection mode according to the detected value of the DC drive voltage.

9. The power supply device of claim 8, wherein:
    the controller controls the relays and the switching unit to operate the circuit in the inrush current protection mode during an initial start up period where the detected value of the DC drive voltage is less than a predetermined value.

10. The power supply device of claim 9, wherein:
    during operation in the inrush current protection mode,
        the second relay connects the source of the DC power and the second end of the resistor, and
        the first relay connects the second end of the inductor and the node.

11. The power supply device of claim 8, wherein:
the controller controls the relays and the switching unit to operate the circuit in the power factor correction mode where the detected value of the DC drive voltage is greater than a first predetermined value and less than a second predetermined value.

12. The power supply device of claim 11, wherein:
during operation in the power factor correction mode,
the second relay connects the source of the DC power and the first end of the inductor, and
the first relay connects the second end of the inductor and the node.

13. The power supply device of claim 8, wherein the controller controls the relays and the switching unit to operate the circuit in the overvoltage protection mode where the detected value of the DC drive voltage is greater than a predetermined value.

14. The power supply device of claim 13, wherein:
during operation in the overvoltage protection mode,
the first relay connects the second end of the resistor and the node, and
the second relay connects the source of the DC power and the first end of the inductor.

15. The power supply device of claim 11, wherein:
the controller changes the operation of the circuit from the power factor correction mode to the overvoltage protection mode where the detected value of the DC drive voltage is greater than the second predetermined value and greater than a third predetermined value.

16. The power supply device of claim 15, wherein:
the DC drive value increases above the second predetermined value due to a voltage regenerated from energy stored due to rotation of the motor.

17. A power supply device for supplying input power to an inverter to drive an AC motor from an input power, the power supply device comprising:
a capacitance connected in parallel with the inverter;
a resistance which limits an inrush current to the capacitance during an initial application of the input power;
an overvoltage protection circuit which selectively discharges the capacitance through the limiting resistance to limit a voltage across the capacitance to a predetermined maximum;
a voltage detector which detects the voltage across the capacitance;
a switching apparatus which selectively connects the resistance to perform one of limiting the inrush current and discharging the capacitance; and
a controller which controls the switching apparatus in response to the detected voltage.

18. The power supply device of claim 17, wherein:
the overvoltage protection circuit comprises an active element selectively connectable in series with the resistance and which controls the discharge of the capacitance through the resistance; and
the controller controls the active element to control the discharge of the capacitance.

19. The power supply device of claim 18, wherein:
the power supply device further comprises an inductance, selectively connectable in series with the capacitance; and
the switching apparatus selectively connects one of the resistance and the inductance to be serially connected with the capacitance.

20. The power supply device of claim 19, wherein:
where the inductance is serially connected with the capacitance,
a diode is interposed between the inductance and the capacitance;
the active element is connected to an end of the diode; and
the controller operates the inductance, the diode, the capacitance and the active element to correct a power factor of the input power.

* * * * *